UNITED STATES PATENT OFFICE

ENGELHARDT GUNKEL, OF CHICAGO, ILLINOIS.

IMPROVEMENT IN PREPARED MEATS.

Specification forming part of Letters Patent No. 203,614, dated May 14, 1878; application filed March 9, 1878.

*To all whom it may concern:*

Be it known that I, ENGELHARDT GUNKEL, of Chicago, in the county of Cook and State of Illinois, have invented a new and useful Compound called "Pulverized Meat," which compound is fully described in the following specification:

The invention relates to that class of compounds which are used as food, and it is to take the place of the so-called "beef extract" for preparing soup and other nutriments.

It consists in drying the meat, in adding to the same the extracts of the requisite spices and vegetables, and in reducing the whole to fine powder.

To prepare the pulverized meat, take a quantity of beef, remove the fatty or tallow portions therefrom, cut it into slices, and sprinkle the same with salt. These slices are now to be dried in a suitable oven by a very slow process until all of their watery portions have been evaporated and the meat is perfectly hard and solid.

In the meantime prepare the flavoring extract by boiling in tallow the requisite vegetables and spices, as porret, celery, parsley, sliced carrots, pepper, and others, in such proportions as will be most grateful to the appetite, which tallow, after being impregnated with the flavor of these vegetables and spices, is filtered through a fine strainer.

Now add to the dried meat a small quantity of the flavored tallow, and grind the whole in a suitable mill until reduced to a fine powder, which is put up into packages or tin boxes ready for the market, and which, if kept dry, will preserve in a fresh state for any length of time in all climates.

For preparing soup, a proportional quantity of water is added to the pulverized meat, which is kept boiling over a slow fire for from fifteen to twenty minutes, when, after removal therefrom, and after the solid matter of the powder has settled to the bottom of the vessel, the clear soup is poured off, which is now ready to be served on the table.

The pulverized meat thus prepared preserves all of the nourishment and flavor of fresh meat; and, the particles of the meat being very fine, the boiling water will extract therefrom instantly all of the soluble matter contained in it, so that a relishing, nourishing, and healthful soup can be prepared therewith within a very short time.

The tallow in which the vegetables and spices are boiled adds an agreeable flavor thereto when used for soup or for other purposes, and in addition the meat by these means becomes thoroughly flavored with the vegetables.

I am aware that compounds have before been made composed of desiccated meat (or fish) and vegetables mixed together, and hereby disclaim the same, my only invention being in replacing the desiccated vegetables in such a compound by a small portion of tallow in which the vegetables and spices have been previously boiled, the tallow having been strained, so as to only retain the flavor of the vegetables and spices.

What I claim as my invention is—

The compound described, consisting of pulverized dried meat, to which is added, before powdering, a small portion of tallow which has been flavored by having vegetables and spices boiled therein, substantially as and for the purpose set forth.

ENGELHARDT GUNKEL.

Witnesses:
WM. H. LOTZ,
EMIL H. FROMMANN.